United States Patent [19]
Cazabat et al.

[11] Patent Number: 6,046,920
[45] Date of Patent: Apr. 4, 2000

[54] POWER CONVERTER WITH IMPROVED CONTROL OF ITS MAIN SWITCHES, AND APPLICATION TO A POWER CONVERTER HAVING THREE OR MORE VOLTAGE LEVELS

[75] Inventors: Stéphane Cazabat, Massy; Christian Delay, Morangis; Jean-Louis Sanhet, Fontenay les Briis, all of France; David Rudniski, Toronto, Canada

[73] Assignee: Alcatel, Paris, France

[21] Appl. No.: 08/998,812

[22] Filed: Dec. 29, 1997

[30] Foreign Application Priority Data

Dec. 30, 1996 [FR] France .................................. 96 16191

[51] Int. Cl.⁷ .......................... H02H 7/122; H02M 3/24; H02M 7/521
[52] U.S. Cl. ............................... 363/136; 363/58; 363/98
[58] Field of Search ............................. 363/27, 58, 136, 363/96, 98

[56] References Cited

U.S. PATENT DOCUMENTS

| | | | |
|---|---|---|---|
| 3,207,974 | 9/1965 | McMurray | 363/136 |
| 3,935,528 | 1/1976 | Brenneisen et al. | 363/136 |
| 4,471,421 | 9/1984 | Brown et al. | 363/136 |
| 4,482,946 | 11/1984 | Bhagwat | 363/136 |
| 5,107,412 | 4/1992 | Fuchs | 363/136 |
| 5,121,317 | 6/1992 | Vogler | 363/96 |
| 5,150,287 | 9/1992 | Gruning | 363/136 |

FOREIGN PATENT DOCUMENTS

WO9205625  4/1992  WIPO ........................... H02M 7/523

OTHER PUBLICATIONS

Mok et al, "Control Complexities Related to High Power Resonant Inverters", PESC96 Record, vol. 2, Jun. 24–27, 1996, Lago Maggiore, Italy, pp. 1040–1046.

W. McMurray, "Resonant Snubbers with Auxiliary Swithces", IEEE Transactions On Industry Applications, vol. 29, No. 2, Mar. 1, 1993, pp. 355–361.

G. A. Fisher, "High power transistor inverters–potential for single device operation at 1000 A and 800V", Proceedings 16th Universities Power Engineering Conference (UPEC) 1981, Sheffield, GB.

*Primary Examiner*—Peter S. Wong
*Assistant Examiner*—Bao Q. Vu
*Attorney, Agent, or Firm*—Sughrue, Mion, Zinn, Macpeak & Seas, PLLC

[57] ABSTRACT

A power converter having two main switches connecting an outlet either to a positive rail or to a negative rail, two free-wheel diodes enabling the current through the load to be maintained, two snubber capacitors, and an auxiliary circuit. The auxiliary circuit includes an auxiliary inductor in series with two auxiliary switches coupled between the outlet and a midpoint of a capacitive voltage divider that provides a midpoint voltage. A detector detects current oscillation between the auxiliary inductor and the snubber capacitors, and then switches off the oscillation current and allows the intended main switch to conduct in response to the interruption.

4 Claims, 3 Drawing Sheets

POWER CONVERTER WITH IMPROVED CONTROL OF ITS MAIN SWITCHES, AND APPLICATION TO A POWER CONVERTER HAVING THREE OR MORE VOLTAGE LEVELS

The present invention relates to so-called "soft switching" power converters, in particular the power converters described in the article entitled "High power transistor inverters—potential for single device operation at 1000 A and 800 V", by G. A. Fisher, published in the minutes of the "16th Universities Power Engineering Conference", Sheffield, Great Britain, in the article entitled "Resonant snubbers with auxiliary switches", by W. McMurray, published in IEEE Transactions on Industry Applications, Vol. 29, No. 2, March/April 1993, and in patent document WO 92/05625.

BACKGROUND OF THE INVENTION

FIG. 1 shows a converter arm of the type described in the above-mentioned publications. The converter arm is intended to feed a load L, represented as being essentially inductive, e.g. a motor, from a DC voltage source delivered between a positive rail VR+ and a negative rail VR−. It essentially comprises:

two main switches S1 and S2, e.g. of the IGBT type, enabling an outlet S leading to the load L to be connected respectively either to the rail VR+, or to the rail VR−;

two free-wheel diodes D1 and D2 enabling current through the load L to be maintained, and respectively coupling the outlet S either to positive rail VR+ or to the negative rail VR−;

two snubber capacitors C1 and C2 between the outlet S and, respectively, the positive rail VR+ and the negative rail VR−; and an auxiliary circuit CA comprising, in particular, an auxiliary inductor LA in series with the two auxiliary switches T1 and T2 that conduct unidirectionally in opposite directions, e.g. thyristors or circuits that are functionally equivalent, coupled between the outlet S and the midpoint M of a capacitive voltage divider DC; the voltage divider itself comprising two divider capacitors CV1 and CV2 connected in series between the positive and negative rails VR+ and VR−, and operating at said midpoint M commonly at a voltage that is halfway between the voltages of the positive and negative rails VR+ and VR−.

In that circuit, the components S1, D1, C1, T1, and CV1 are paired respectively with the components S2, D2, C2, T2, and CV2, i.e. they show respectively the same electrical characteristics on all occasions. A control circuit (not shown) measures voltages and currents at various points of the converter comprising the above arm, and in application of an appropriate program, controls triggering of the main switches S1 and S2 and of the auxiliary switches T1 and T2 by acting on the control electrodes thereof which are sketched in the figure, e.g. at ec1, thereby causing them to operate in a manner which is described below.

To illustrate the operation of the circuit, in particular in the case of a DC—DC converter, the arm of FIG. 1 operates as a chopper, and it is assumed that it begins in a state in which none of the switches is conductive and in which a current $I_L$ is maintained through the load L by the free-wheel diode D2 which is then conducting. As a result, and ignoring the threshold voltage of the diode D2, the outlet S is at the same potential as the rail VR−, e.g. 0 volts. The capacitors CV1 and CV2 have the same capacitance, and they are charged to the voltage that exists between the rails VR+ and VR−, referred to below as +V, such that the midpoint M is at the middle voltage +V/2.

The circuit begins to switch over in a first step in which the auxiliary switch T1 is triggered by the control circuit. It becomes conductive and the auxiliary inductor LA is powered between +V/2 (ignoring the threshold of T1) and 0 V (ignoring the threshold of D2); the current $I_A$ that passes through it increases linearly. This current is subtracted from the current $I_L$ passing through the diode D2.

When $I_A = I_L$, the diode D2 ceases to conduct. The outlet S is no longer coupled to the rail VR−. The auxiliary inductance LA is then in series with the capacitors C1 and C2 which are themselves in parallel with each other as seen from the inductor. Current oscillation then begins between the inductor and the capacitors. In the first half-cycle of this oscillation, the midpoint of the snubber capacitors C1 and C2, i.e. the outlet S, goes from 0 to +V volts.

The switch S1 is then triggered, without voltage across its terminals, and it then carries the current $I_L$. The inductor LA, now connected between the point M at the potential +V/2 and the outlet S which is maintained at the potential +V via the switch T1, now sees the current $I_A$ that is passing through it decrease linearly. When it drops to zero, the auxiliary switch T1 becomes non-conductive. That is why a thyristor type switch is used, since that type of switch has the property of switching off when the current flowing through it drops to zero, or when any equivalent combination of components is used, e.g. a transistor or an IGBT in series with a diode.

In the opposite direction, switchover for returning to the initial situation takes place in similar manner, making use of the auxiliary circuit CA whose auxiliary switch T2 is triggered, in the same manner as described above for the auxiliary switch T1. In addition, the switch S1 is then likewise caused to cease conducting. The voltage at the outlet S then passes from +V to 0 volts in an oscillation that ends with the auxiliary switch T2 ceasing to conduct, with the diode D2 then becoming conductive under the effect of the current $I_L$.

The converter arm could be used in ways other than that described, and in particular as shown in FIG. 2 where the load is connected between two converter arms identical to the arm of FIG. 1, with the elements of the second arm being given the same references as those of the first, but associated with the prime symbol In addition, and in a variant, the inductors LA and LA' can be connected between the auxiliary switches and the point M instead of being connected between the auxiliary switches and the point S; that changes nothing from the point of view of operation described above. Other modes of operation can be applied to a two-arm converter as shown in FIG. 2, in particular it can operate as an inverter. The operation of each of the two arms is based on that described above. When operating as a chopper, the operation of the left arm implies in alternation the diode D2 and the switch T1, whereas the operation of the right arm implies, synchronously, the diode D1' and the switch T2'. When operating as an inverter, after a positive half-cycle, or a plurality of portions of a positive half-cycle, as described above, operation of a negative half-cycle will involve on one side the diode D1 and then the switch T2, and on the other side the diode D2', and then the switch T1.

In these various cases, the voltage of the output S of one arm of the converter switches over without loss, providing the voltage on said outlet S does indeed go from 0 to +V volts, i.e. providing the voltage across the terminals of the auxiliary circuit CA is reversed, i.e. providing the voltage at the point M is indeed equal to +V/2. For this to be the case, the capacitances of the capacitors CV1 and CV2 of the voltage divider DC must be large enough, the symmetry of the components involved in the conduction stages of the auxiliary circuit must be almost perfect, as must the resistive losses in said auxiliary circuit. Experience shows that these conditions are difficult to satisfy, and that constitutes a problem.

Any imperfection in the above gives rise to the voltage at the point S at the end of the half-cycle under consideration of the oscillation not being +V/2, but being a smaller voltage, such that the potential difference between the terminals of the main switch S1 is not zero with the switch being made conductive even though a residual potential remains across its terminals, thereby giving rise to energy being dissipated in the main switch, which is a drawback insofar as the resulting heat must be dumped and the efficiency of the converter is correspondingly reduced.

Nevertheless, since such imperfections are inevitable, a conventional solution is to accept them and to dimension the power converter accordingly. Nevertheless, that gives rise to the additional problem of determining when the main switch should be made conductive; given that the voltage across its terminals does not reduce to zero, there is no way in which the voltage across its terminals can be detected as passing through zero in order to trigger conduction thereof, which technique would present automatically the advantage of switching without loss. The conventional solution to this additional problem consists in making the main switch conductive when the voltage across its terminals drops below a predetermined voltage threshold. The advantage then lies in being certain that losses will not exceed a defined maximum and so the converter will not be overloaded.

OBJECTS AND SUMMARY OF THE INVENTION

The present invention is based on the observation that applying that conventional solution leads to maximum losses being accepted by way of safety precaution, even though that is generally excessive.

When constructing a converter, the components used generally exhibit dispersion within defined tolerances. The above-threshold calculation is therefore performed by assuming the most unfavorable circumstances corresponding to such tolerances. Setting the threshold on a case-by-case basis would require special measurements to be performed during manufacturing and testing, and would also require means for adjusting the threshold. That is not economically acceptable. In addition, the converter does not always operate at maximum load; this is true in particular when operating with AC, but it can also happen in most DC applications. Again the threshold is set so as to comply with the most unfavorable operating conditions which are encountered only rarely, and again complying with safety needs gives rise to excessive loss of efficiency.

The invention thus proposes a solution to said additional problem that is more satisfactory, that does not include economically unacceptable requirements, and that achieves advantages that are significant in terms of the efficiency of the power converter.

According to the invention, the above-defined power converter further comprises, means for detecting current oscillation between said auxiliary inductor and said snubber capacitors in a switchover process intended for causing a corresponding main switch to be switched on, and including, for this purpose, the switching on of an auxiliary circuit, after which said oscillation current is interrupted, and to cause said corresponding main switch to be rendered conductive, in response to said interrupt.

In an embodiment, said detection comprises evaluating on a substantially permanent basis the current flowing through said auxiliary circuit and in a load circuit, with the difference between the two currents representing said oscillation current.

In another embodiment, said detection comprises substantially permanently evaluating the current flowing through said snubber capacitors and in particular when said current becomes zero.

The invention is thus based on the fact that the voltage across the terminals of the capacitors is at a minimum at the end of a half-period of oscillation, when the oscillation current reduces to zero. That is the best moment for causing the intended main switch to conduct, since losses are then at a minimum.

It will be observed that in the article entitled "Control complexities related to high power resonant inverters", by P. P. Mok et al., published in IEEE publication PESC 96, in June 1996, the idea relates to the converter of FIG. 2c which is a soft-switching power converter, to make a main switch conductive (bottom of lefthand column on page 1045) when the snubber capacitor connected to its terminals is fully discharged; to detect this moment, an instant is envisaged for evaluating the current flowing through the capacitor (top of righthand column, same page), which option is immediately discarded in favor of evaluating a voltage since that can be done more easily. The additional problem to which the present invention relates is not even mentioned. The means consisting in evaluating the current flowing through the snubber capacitor, although it is indeed mentioned therein, and is then immediately discarded, is certainly not presented as being suitable for resolving said additional problem.

The above relates to power converters having one or more two arms, i.e. one or two voltage levels. Also known, from an article entitled "Three level auxiliary resonant commutated pole inverter for high power applications", by J. G. Cho et al., published in the journal IEEE PESC 1996, at pages 1019 to 1026, is a converter having three voltage levels that is generally similar to the above. Power converters having more than three levels can also be designed in similar manner. The same problem of determining optimum conditions for triggering the main switches arises in main switch circuits at all levels of such converters having three or more levels. The invention applies to converters of such types, as described above, for all of the main switches contained therein.

BRIEF DESCRIPTION OF THE DRAWINGS

The various objects and characteristics of the invention are described in greater detail below with reference to the following description of an embodiment, given by way of non-limiting example, and made with reference to the accompanying figures, in which.

MORE DETAILED DESCRIPTION

Figure 1:
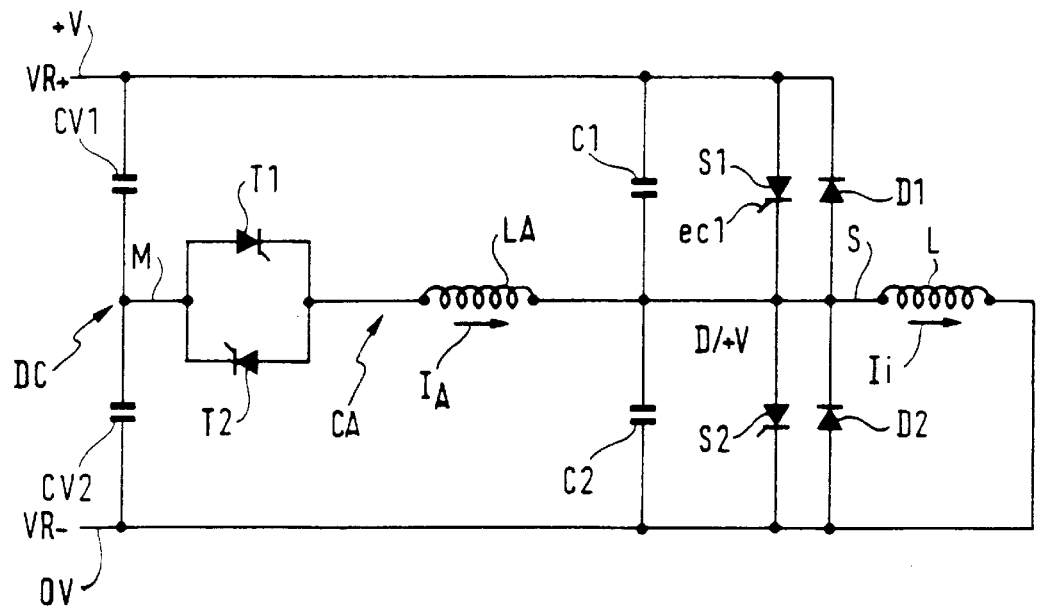
FIG. 1, described above, is the circuit diagram for one arm of a power converter of known type, and to which the present invention applies.
Figure 2:
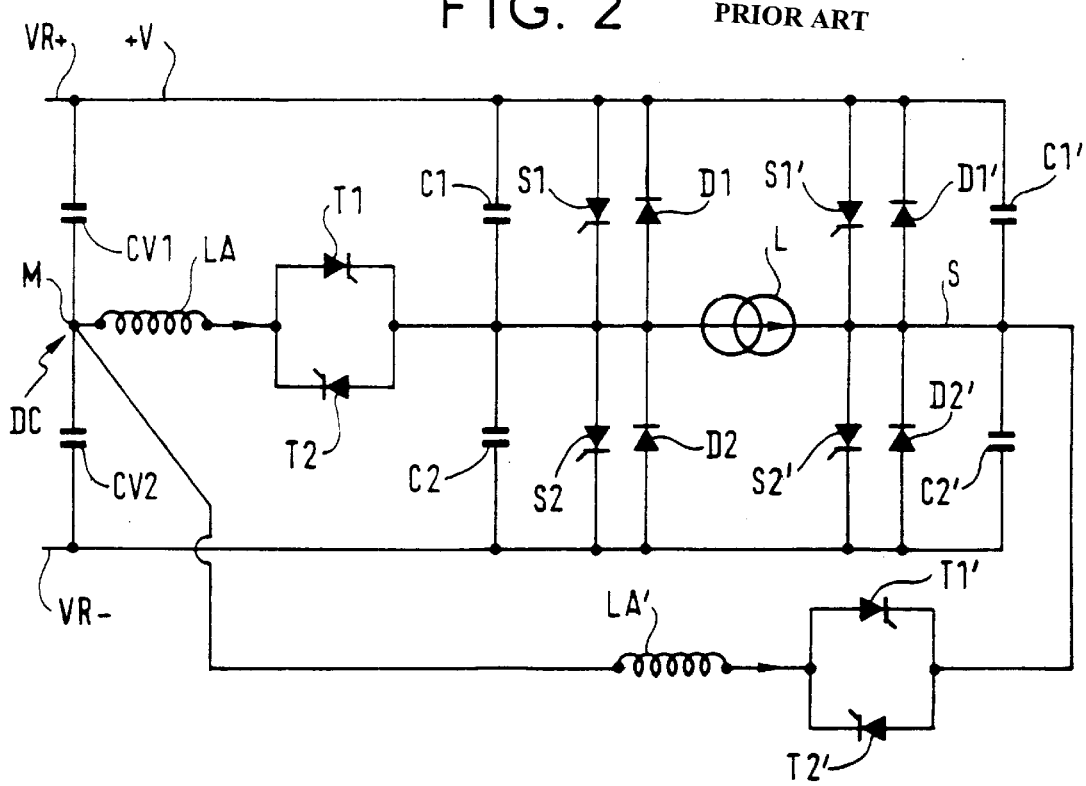
FIG. 2, also described above, is the circuit diagram of a power converter of known type to which the present invention applies.
Figure 3:
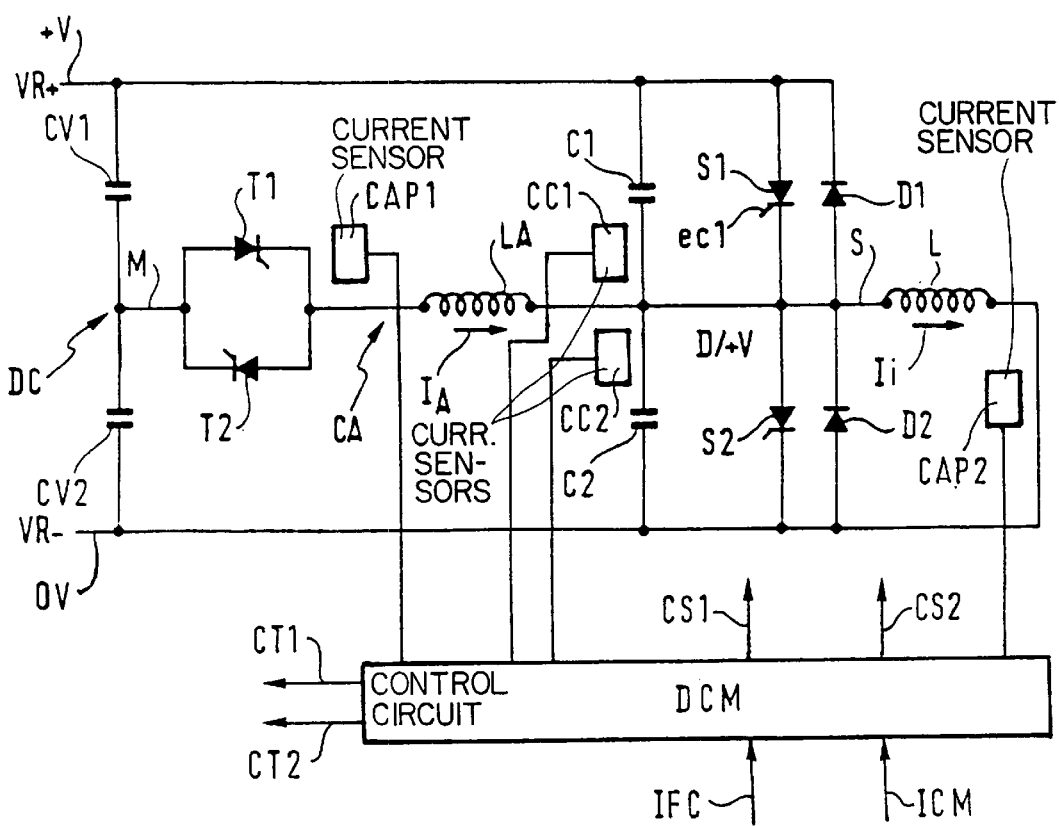
FIG. 3 shows a FIG. 1 type power converter including means for controlling the switching on of the main switches in accordance with the present invention.

The embodiment of the invention shown in FIG. 3 is intended for controlling the operation of the arm of the converter shown in FIG. 1, or of one of the arms of the converter shown in FIG. 2. Thus, the circuit of FIG. 3 comprises current sensors for substantially continuously evaluating the current flowing through the conductors with which they are respectively associated, comprising in particular a first sensor CAP1 associated with auxiliary circuit CA, and evaluating more particularly the current flowing through the auxiliary inductor LA, and a second sensor CAP2 doing the same for the current flowing through the load, and/or a third sensor CC1 and a fourth sensor CC2 for evaluating respectively the currents flowing through each of the snubber capacitors C1 and C2. The sensors are connected to an operation control device DCM which also receives operation control instructions via an input ICM together with other information concerning the operation of the converter via an input IFC. It delivers, in particular, control signals CT1 and CT2 which control the operation of the auxiliary switches T1 and T2, and control signals CS1 and CS2 which control the operation of the main switches S1 and S2.

Current sensors are well known in the art. To implement the present invention, it is possible to use Hall effect sensors that are commercially available. Implementing the invention therefore requires little outlay, particularly since only two of the sensors are essential, either the sensors CAP1 and CAP2, or the sensors CC1 and CC2.

In conventional manner, and as explained at the beginning of this specification, the operation control device DCM, being informed on the state of the converter by the signals coming from the sensors shown, and by other signals coming from sensors that are not shown and that are applied to its input IFC, contains an operating program, and in response to control signals from an external source that is not shown, applied thereto via its input ICM, controls switchover of the converter from one conduction state to another.

Going back to the example given at the beginning of this specification, assuming that the current $I_L$ is established via the diode D1, then switchover consists in making the main switch S1 conductive, with the device DCM initially causing the auxiliary switch T1 to conduct, so that current is established and then grows in the auxiliary circuit CA, with the current flowing through the diode D2 ending up as zero. At this moment, oscillation begins in which current will discharge the snubber capacitor C1 and charge the snubber capacitor C2. The operation control device DCM detects the beginning of such oscillation by monitoring variation in voltage at the point S (as communicated by an appropriate sensor), by detecting a decrease in the current flowing through the capacitor C2, as detected by the sensor CC2, or an increase in the current through the capacitor C1 as detected by the sensor CC1, assuming that sensors CC1 and CC2 are provided, or by any other means that the person skilled in the art will have little difficulty in devising.

From that instant, the device DCM enters a stage in which it must detect interruption of the oscillation current at the end of the oscillation half-period.

In one embodiment, this event is detected by the fact that the currents $I_A$ and $I_L$ whose values are communicated to the control device DCM by the sensors CAP1 and CAP2 become equal. At this specific instant, the control device DCM delivers a signal on its output CS1 that causes the main switch S1 to conduct. Thereafter, operation continues as described above.

In a second embodiment, this event is detected by the fact that the current flowing through the snubber capacitor C1 cancels, with this being detected by the sensor CC1, or the current flowing through the snubber capacitor C2 cancels, as detected by sensor CC2. This second solution is equivalent to the preceding solution.

The person skilled in the art will be able to find other means for detecting the same event. The invention consists essentially in that this event, appropriately detected, serves to cause the corresponding main switch to be switched into the conductive state.

Naturally, and without any need for a detailed description, corresponding means can be used to switch on the other main switch S2 under the same operating conditions.

Figure 4:
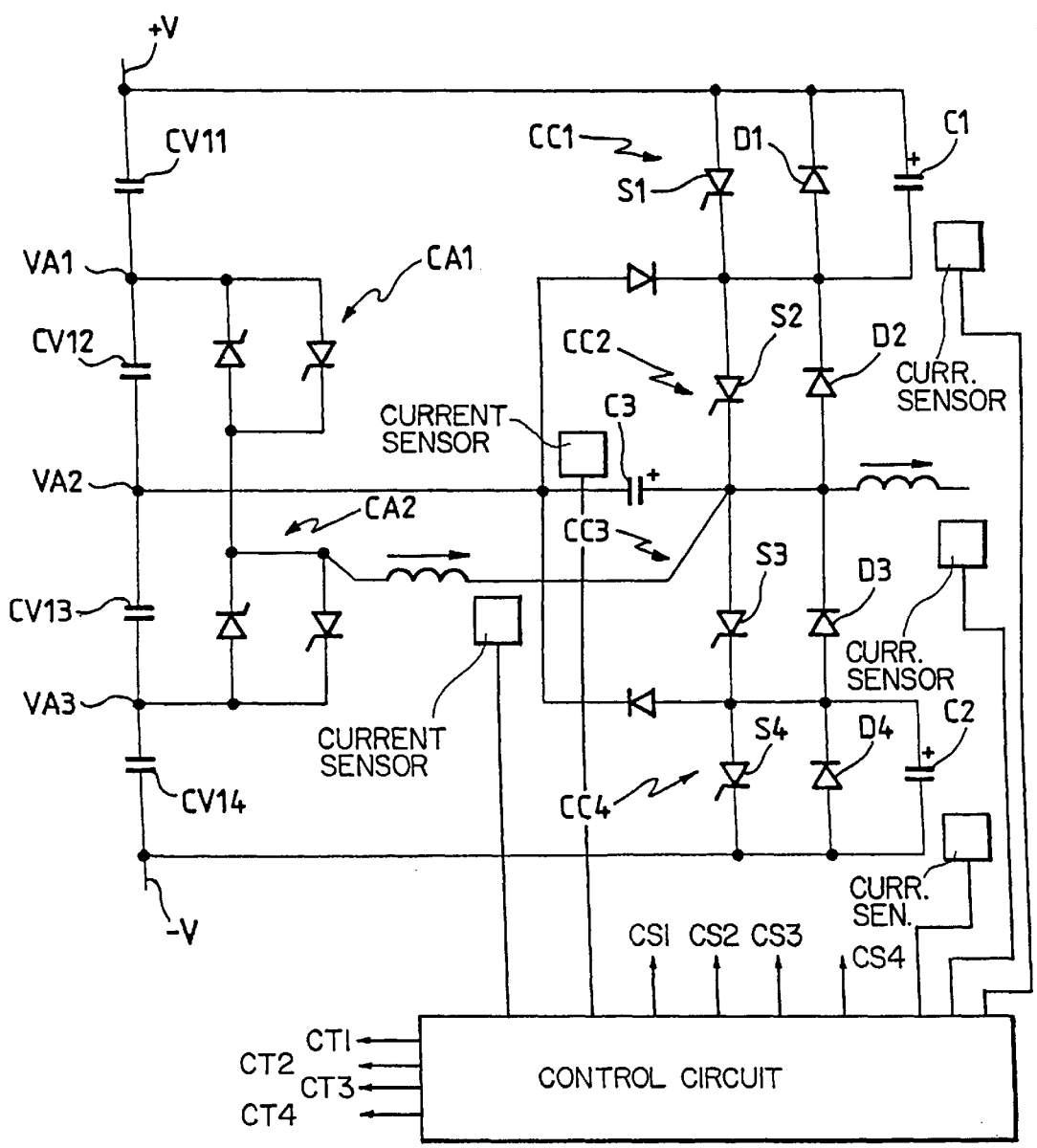
FIG. 4 shows a three-level power converter to which the present invention applies.

S1milarly, FIG. 4 shows a three-level type converter of the type described in the above-mentioned article entitled "Three level auxiliary resonant commutated pole inverter for high power applications", by J. G. Cho et al. In each of the control circuits CC1 (main switch S1 and free-wheel diode D1), CC2 (main switch S2 and free-wheel diode D2), CC3 (main switch S3 and free-wheel diode D3), and CC4 (main switch S4 and free-wheel diode D4), the invention applies relative to the current charging the capacitors C1, C2, and C3 under the control of auxiliary circuits CA1, CA2 coupled to terminals VA1, VA2, and VA3 of a capacitive voltage divider CV11, CV12, CV13, and CV14 via means not shown but similar in all respects to those described above with reference to FIGS. 1 to 3, as will be readily understood by the person skilled in the art.

Main switch control improved in this way makes it possible to cause the main switch to conduct when the residual voltage across its terminals is at a minimum, thereby limiting the losses of the power converter, and for equivalent technology, making it possible to increase overall performance.

We claim:

1. A power converter comprising at least one arm including, between a positive rail and a negative rail:
   two main switches enabling an outlet leading to a load to be connected either to the positive rail or the negative rail;
   two free-wheel diodes enabling the current through the load to be maintained by coupling the outlet respectively to the positive rail or to the negative rail;
   two snubber capacitors between the outlet and, respectively, the positive rail, and the negative rail; and
   an auxiliary circuit comprising, in particular, an auxiliary inductor in series with two oppositely-directed one-way auxiliary switches coupled between the outlet and a midpoint of a capacitive voltage divider itself comprising two voltage-dividing capacitors connected in series between the positive rail and the negative rail, and delivering at said midpoint, a voltage that is nominally a midpoint voltage compared with the voltages of the positive rail and of the negative rail;
   the converter further comprising a detector for detecting current oscillation between said auxiliary inductor and said snubber capacitors in a switchover process intended for causing a corresponding main switch to be switched on, said detector detecting an interruption of said oscillation current after said auxiliary circuit is switched on, and causing said corresponding main switch to be rendered conductive in response to said interruption.

2. A converter according to claim 1, wherein said detection comprises evaluating the current flowing through said auxiliary circuit and in a load circuit, with the difference between the two currents representing said oscillation current.

3. A converter according to claim 1, wherein said detection comprises evaluating the current flowing through said snubber capacitors and in particular when said current becomes zero.

4. A power converter having three or more voltage levels, comprising:

a plurality of control circuits, each having a main switch and a free-wheel diode, enabling an outlet leading to a load to be connected one of said voltage levels and enabling the current through the load to be maintained;

a plurality of snubber capacitors between the outlet and voltage terminals; and auxiliary circuits comprising pairs of oppositely-directed one-way auxiliary switches coupled in series with at least one auxiliary inductor between the outlet and respective intermediate points of a capacitive voltage divider comprising voltage-dividing capacitors connected in series between voltage levels, and delivering at said intermediate points, a voltage that is nominally a midpoint voltage compared with the voltages of said voltage levels;

the converter further comprising detectors for detecting current oscillation between said at least one auxiliary inductor and said snubber capacitors in a switchover process intended to cause a corresponding main switch to be switched on, said detector detecting an interruption of said oscillation current after one of said auxiliary circuits is switched on, and causing said corresponding main switch to be rendered conductive in response to said interruption.

* * * * *